3,271,930
PRE-TREATMENT OF CARRIERS FOR USE IN GAS/LIQUID DISTRIBUTING CHROMATOGRAPHY
Gert Ewald, Hermulheim, near Cologne, Horst Zech, Bruhl, near Cologne, and Hermann Esser, Gleuel, near Cologne, Germany, assignors to Knapsack-Griesheim Aktiengesellschaft, Knapsack, near Cologne Germany, a corporation of Germany
Filed Oct. 14, 1964, Ser. No. 403,739
Claims priority, application Germany, Oct. 23, 1963, K 51,156
6 Claims. (Cl. 55—67)

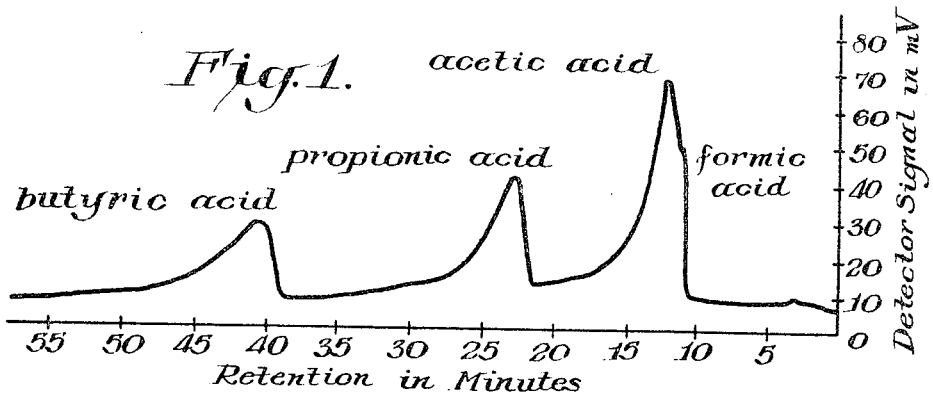
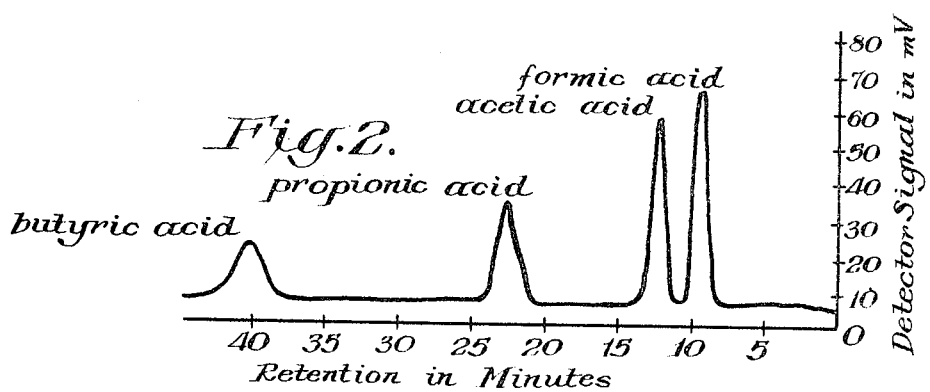
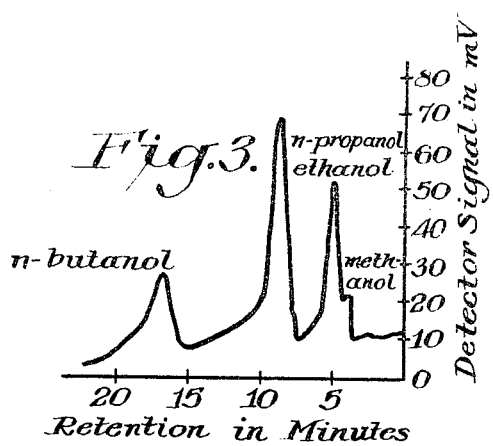
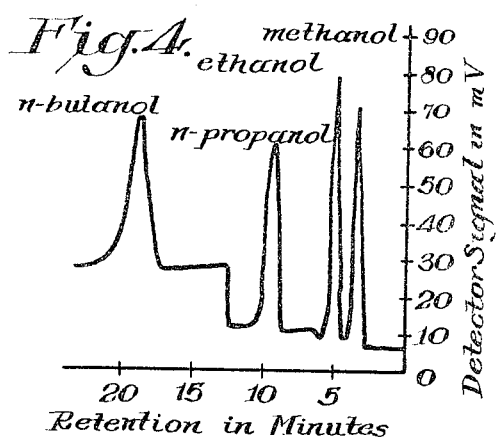
INVENTORS
Gert Ewald
Horst Zech
Hermann Esser United States Patent Office 3,271,930
Patented Sept. 13, 1966

The present invention provides a process for the pretreatment of carrier substances for use in the gas/liquid distributing chromatography.

Increasing importance has been attached during recent years to the gas chromatographical method for analyzing substance mixtures. This method uses a gas chromatograph which is preferably operated by the so-called "degree of distribution method," wherein an inert carrier gas is used to cause a mixture to be analyzed to flow in gas form in a separating column over a carrier substance impregnated with a separating liquid. Kieselguhr or aluminum oxide or silicates, for example, are used as the carrier substance, and silicon oils, dioctyl sebacate or diphenyl phthalate, for example, are used as the separating liquid.

In the separating column, the gas phase and separating liquid are ultimately in an equilibrium of distribution which varies for the single components of the substance mixture to be analyzed with the effect that each substance is conveyed by the carrier gas through the separating column at a specific flow rate. The gases which successively leave the separating column can be identified e.g. by measuring their thermal conductivity, the results obtained being plotted on a chromatogram or fractogram. The bands appearing on the chromatogram vary in position and height and therefore permit conclusions to be drawn as to the nature and concentration of the components forming part of the substance mixture analyzed. Various process variables e.g. amount of gas flow, pressure, temperature, nature of separating liquid and carrier substance, substantially influence the bands' shape which should be fairly symmetrical. Thus, the result of analysis may be impaired by the natural adsorptive properties of the carrier substance which therefore must be inactivated prior to its being used.

The present invention provides a process for the pretreatment with orthophosphoric acid, of carrier substances comprising kieselguhr or aluminum oxide or silicates or special preparations of these substances.

It is known that carrier substances e.g. kieselguhr can be subjected prior to their being used in gas-chromatographical analyses to a pre-treatment process of the type wherein the kieselguhr is suspended in concentrated hydrochloric acid, and the resulting suspension is allowed to stand for 48 hours. The hydrochloric acid is successively suction-filtered, the kieselguhr is washed with distilled water until free from chloride and dried for several hours at 350° C. However, kieselguhr so prepared is not at all inactivated to the necessary extent and it still has active centers which may negatively affect the result of analysis or change the bands appearing in the chromatogram by tailing.

According to a further conventional method of inactivating carrier substances, the inorganic carrier material is treated with dimethyl dichlorosilane at a temperature of 50–70° C., but the carrier must previously be subjected to water-treatment for a period of up to 20 hours at 275° C. in an autoclave in order to obtain the desired result.

Still further, attempts have already been made to deprive the carrier material of its adsorptive properties by admixing the separating liquid with an appropriate inhibitor. A mixture tested under practice conditions as the stationary liquid phase comprises e.g. silicon oil admixed with stearic acid and orthophosphoric acid in a definite quantitative ratio.

A mixture of this type does not spontaneously act on the surface of the carrier which is rather stabilized or inactivated with the course of time and after repeated use thereof. It must be assumed that the separating liquid hinders or retards the action of the inhibitor on the carrier.

The present invention now provides a simple process for inactivating carrier substances for use in gas-chromatographical analyses, which are substantially deprived of active centers and unexpectedly can also be used with particular advantage for the separation of polar substance mixtures.

The present process for the pre-treatment of carrier substances consisting of kieselguhr and/or aluminum oxide and/or silicates or of special preparations thereof for use in the gas:liquid distributing chromatography comprises more especially intimately mixing the carrier substance with about 1 to 20% by weight orthophosphoric acid and heating the resulting mixture for about 0.5 to 10 days at a temperature of about 100 to 300° C. The carrier substance so pre-treated can successively be impregnated or covered with a suitable separating liquid.

As against the conventional use of phosphoric acid in admixture with the separating liquid and stearic acid, the process of the present invention comprises first pretreating the carrier substance with phosphoric acid alone and then contacting the carrier so inactivated with the separating liquid. The present process thus enables completely inactivated carrier substances to be used for analyzing substance mixtures as opposed to conventional methods, wherein the surface of the carrier is inactivated but gradually.

Phosphoric acid of 85% strength is preferred, but dilute phosphoric acid may be employed as well which on being heated in conjunction with the carrier material is increasingly dehydrated and thus concentrated. In order to accelerate elimination of the resultant steam, it is advantageous to cause an inert gas stream to flow through the mixture of carrier substance with phosphoric acid.

According to an advantageous embodiment of the process of the present invention the mixture of carrier material with phosporic acid is preferably heated at a temperature of about 200° C. When 85% phosphoric acid is used and the temperature is situated at 200° C., the mixture is heated for a 4 days' period. Needless to say that the heating period will be shorter at temperatures higher than 200° C., e.g. at 300° C., and inversely will be longer at temperatures lower than 200° C. Also, the heating time will be longer at a certain temperature when dilute phosphoric acid is used for inactivating the carrier.

The 85% phosphoric acid is preferably employed in a proportion of 10% by weight for the pre-treatment of the carrier under conditions such as set forth above. Especially good results of inactivation will be obtained with the use of carrier substances such as marketed under the trade mark designations Chromosorb, Sterchamol or Celite. Chromosorb and Celite are preparations of kieselguhr of specific origin, and Sterchamol is a kieselguhr-clay preparation.

The carrier material is prepared e.g. by mixing it with a certain amount of phosphoric acid and heating the resulting mixture in a heated tube at a maximum temperature of 300° C. while introducing an inert gas concurrently therewith. Following the necessary heating period, the carrier material is allowed to cool which thereafter can be used immediately for making a column packing, i.e. by mixing the carrier with an appropriate separating liquid, e.g. dioctyl sebacate or silicon oils or diphenyl phthalate.

The process of the present invention is clearly superior to the methods conventional for inactivating carrier substances as will be seen from an optic comparison of the respective chromatograms, the chromatograms produced with the carrier pre-treated by the process of the present invention showing the desired symmetrical bands without tailing, which therefore can be quantitatively evaluated. In this context, it is immaterial whether the substance mixture to be separated into its components comprises polar or non-polar components. Even very strong polar compounds, such as mixtures consisting of various carboxylic acids or alcohols or dinitriles can be separated by gas-chromatography without any tailing. Furthermore, the column packings prepared in accordance with the process of the present invention permit making an analysis at any desired moment, and it is not necessary to this end, prior to the analysis, to load the column packing in conventional manner with the substance mixture to be analyzed so as to improve selectivity. It should finally be noted that the phosphoric acid used herein as the inactivating agent is a readily available and commercially inexpensive feed product.

*Example 1*

90 parts by weight Chromosorb R were intimately mixed with 10 parts by weight 85% orthophosphoric acid. The mixture was heated in an electrically heated tube for 96 hours at 200° C. and nitrogen was caused to flow concurrently therewith through the tube. The carrier material so pre-treated was allowed to cool, withdrawn from the tube and covered in conventional manner with a separating liquid.

*Example 2*

95 parts by weight aluminum oxide were intimately mixed with 5 parts by weight 85% orthophosphoric acid. The mixture was heated in an electrically heated tube for 96 hours at 200° C. and a slow stream of nitrogen was caused to flow concurrently therewith through the tube. The carrier material so pre-treated was allowed to cool, withdrawn from the tube and covered in conventional manner with a separating liquid.

In the following there is compared the efficiency of a chromatographic column packed with material which had been pre-treated in accordance with the process of the present invention with the efficiency of a column in which the separating liqiud used for covering the carrier substance had been admixed in conventional manner with a small proportion of phosphoric acid. The results obtained by the comparative test are indicated in FIGS. 1 to 4 of the accompanying chromatograms, the chromatograms shown in FIGS. 1 and 3 having been obtained with a conventional chromatographic column, and the chromatograms of FIGS. 2 and 4 having been obtained with a column packing pre-treated according to the process of the present invention. The gas-chromatographic separation was realized once with a mixture of formic acid, acetic acid, propionic acid and butyric acid and once with a mixture comprising methanol, ethanol, n-propanol and n-butanol. The mixtures were separated into their components in the columns to be tested as to their efficiency under identical conditions such as set forth below:

Chromatographic column __ 3 meters long, 4 mm. wide.
Carrier _____ Chromosorb R.
Separating liquid _____ Dioctyl sebacate.
Proportion of separating liquid for covering carrier __ 33% by weight, related to quantity of carrier.
Carrier gas _____ 40 cc. helium per minute.
Temperature in evaporating chamber _____ About 220° C.
Working temperature _____ 140° C. for separating the carboxylic acid mixture, 120° C. for separating the alcohol mixture.

The chromatograms shown in FIGS. 1 and 3 were made with not pre-treated Chromosorb R which had been covered with dioctyl sebacate and 85% phosphoric acid, the phosphoric acid being used in a proportion of 1% by weight, related to the Chromosorb R quantity.

The chromatograms shown in FIGS. 2 and 4 were made under analogous working conditions, but the Chromosorb R used as the carrier had been pre-treated in the manner set forth in Example 1. The dioctyl sebacate serving as the separating liquid was here free from addends.

A comparison of the chromatograms shown in FIGS. 1 to 4 shows distinctly the advantages offered by the carrier material pre-treated in accordance with the present invention. Undesired tailing is obviated and quantitative evaluation of the chromatograms is thus rendered possible. Furthermore, the selectivity of the column is considerably improved.

We claim:

1. A gas chromatographical process for analyzing gaseous mixtures comprising the steps of intimately mixing a chromatographic carrier substance selected from the group consisting of kieselguhr, aluminum oxide, silicates and special preparations thereof with about 1–20% by weight of said carrier substance of orthophosphoric acid, heating the resulting mixture for a period of about 0.5 to about 10 days at a temperature of about 100–300° C., contacting said acid treated carrier substance with a separating liquid, and passing over said carrier substance contacted with said separating liquid said gaseous mixtures to be analyzed.

2. A process as claimed in claim 1, wherein the mixture of carrier substance with orthophosphoric acid is heated while causing an inert gas stream to flow through the said mixture.

3. A process as claimed in claim 2, wherein the inert gas is nitrogen.

4. A process as claimed in claim 1, wherein an about 85% orthophosphoric acid is used.

5. A process as claimed in claim 4, wherein the 85% orthophosphoric acid is used in a proportion of about 10% by weight, related to the finished carrier substance.

6. A process as claimed in claim 1, wherein the mixture of carrier substance with about 85% orthophosphoric acid is heated for about 4 days at a temperature of about 200° C.

(References on following page)

References Cited by the Examiner

UNITED STATES PATENTS

| | | | |
|---|---|---|---|
| 2,067,764 | 1/1937 | Ipatieff | 252—435 |
| 2,233,144 | 2/1941 | Pinkerton et al. | 252—435 |
| 2,569,092 | 9/1951 | Deering | 252—437 |
| 2,596,497 | 6/1952 | Mauity | 252—435 |
| 2,843,640 | 7/1958 | Langlois | 252—450 |

OTHER REFERENCES

Emery et al., Analytical Chemistry, 1962, vol. 34, No. 10, pp. 1196–1198.

Littlewood et al., Chemical Society Journal, 1955, Part II, pp. 1480–1482.

REUBEN FRIEDMAN, *Primary Examiner.*

BENJAMIN HENKIN, *Examiner.*

R. M. DAVIDSON, C. N. HART, *Assistant Examiners.*